United States Patent
Puerta et al.

(10) Patent No.: US 10,480,404 B2
(45) Date of Patent: Nov. 19, 2019

(54) METHOD FOR INJECTING WATER INTO A MULTISTAGE AXIAL COMPRESSOR OF A GAS TURBINE

(75) Inventors: Luis Puerta, Rieden (CH); Marco Micheli, Schöfflisdorf (CH); Wolfgang Kappis, Fislisbach (CH); Erik Peter Boldt, Enköping (CH)

(73) Assignee: Ansaldo Energia Switzerland AG, Baden (CH)

( * ) Notice: Subject to any disclaimer, the term of this patent is extended or adjusted under 35 U.S.C. 154(b) by 2143 days.

(21) Appl. No.: 13/557,757

(22) Filed: Jul. 25, 2012

(65) Prior Publication Data
US 2013/0028707 A1   Jan. 31, 2013

(30) Foreign Application Priority Data

Jul. 25, 2011  (CH) ...................................... 1238/11

(51) Int. Cl.
| F02C 3/30 | (2006.01) |
| F02C 7/143 | (2006.01) |
| F04D 29/58 | (2006.01) |
| F04D 29/70 | (2006.01) |

(52) U.S. Cl.
CPC ............ *F02C 3/305* (2013.01); *F02C 7/1435* (2013.01); *F04D 29/5846* (2013.01); *F04D 29/705* (2013.01); *F05D 2260/212* (2013.01); *F05D 2270/102* (2013.01)

(58) Field of Classification Search
CPC .. F02C 3/305; F02C 7/1435; F05D 2260/212; F01D 25/002; F01D 25/305
See application file for complete search history.

(56) References Cited

U.S. PATENT DOCUMENTS

| 4,571,151 A | 2/1986 | Paul |
| 6,398,518 B1 | 6/2002 | Ingistov |
| 6,634,165 B2 | 10/2003 | Tomlinson et al. |
| 7,712,301 B1 * | 5/2010 | Wagner ................. F01D 25/002 |
| | | 134/23 |
| 2004/0025513 A1 | 2/2004 | Walsh et al. |

(Continued)

FOREIGN PATENT DOCUMENTS

| DE | 101 16 117 A1 | 10/2002 |
| EP | 1 365 127 A2 | 11/2003 |

(Continued)

OTHER PUBLICATIONS

Search Report dated Nov. 18, 2011, by the Swiss Patent Office for Application No. 12382011.

*Primary Examiner* — Christopher Verdier
*Assistant Examiner* — Michael L Sehn
(74) *Attorney, Agent, or Firm* — Buchanan Ingersoll & Rooney PC

(57) ABSTRACT

A method is disclosed for injecting water into a multistage axial compressor of a gas turbine. With low equipment cost, a significant power enhancement can be achieved, even under changing boundary conditions, by water being injected at a plurality of points along the axial compressor, and by the injected water mass flow being controlled at the individual injection points in accordance with ambient conditions and operating parameters of the gas turbine in such a way that an evened-out loading in the individual stages of the axial compressor can be created.

20 Claims, 1 Drawing Sheet

(56) References Cited

U.S. PATENT DOCUMENTS

2004/0177618 A1*  9/2004  Placko .................. F02C 3/305
                                                    60/775
2005/0063819 A1   3/2005  Buehler et al.
2006/0075755 A1   4/2006  Haertel et al.
2008/0247885 A1  10/2008  Hagen

FOREIGN PATENT DOCUMENTS

| EP | 1 522 696 A2 | 4/2005 |
| EP | 1 518 039 B1 | 8/2007 |
| EP | 1 903 188 A2 | 3/2008 |
| WO | WO 03/048545 A1 | 6/2003 |

* cited by examiner

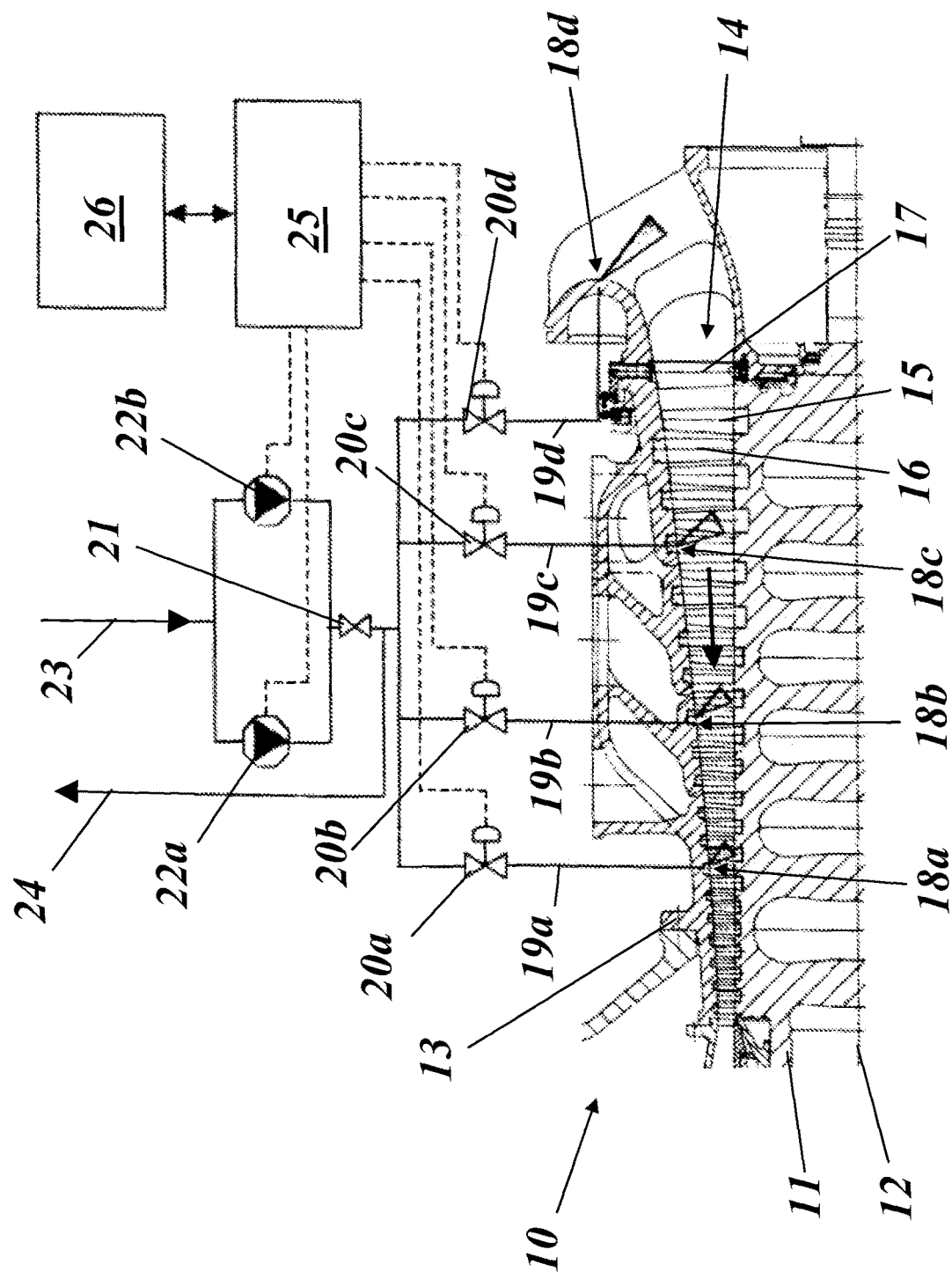

METHOD FOR INJECTING WATER INTO A MULTISTAGE AXIAL COMPRESSOR OF A GAS TURBINE

RELATED APPLICATION

This application claims priority under 35 U.S.C. § 119 to Swiss Patent Application No. 01238/11 filed in Switzerland on Jul. 25, 2011, the entire content of which is hereby incorporated by reference in its entirety.

FIELD

The present disclosure refers to a method for injecting water into a multistage axial compressor of a gas turbine, and to an injection system for implementing the method.

BACKGROUND

The injecting of water into the inlet of gas turbines is used for power enhancement and also for improving the efficiency. The power enhancement is brought about both by the reduction in the compression effort and by the increase in the mass flow.

The injecting of water into the compressor can have two physical effects:

1. Inlet cooling:

The evaporation of water in the inlet upstream of the first blade row of the compressor, which saturates the air flow, leads to a lowering of the compressor inlet temperature on account of the latent evaporation heat.

2. Wet Compression:

The evaporation of water in the compressor creates a phenomenon which is referred to as "wet compression" (see, for example, WO 03/048545). The compression of the resulting 2-phase flow entails the transfer of heat from the gas phase to the liquid phase for the evaporation, which cannot be considered as an adiabatic process. Furthermore, the resulting steam from the droplet evaporation has an influence upon the mass flow in the compressor passage and an increase in the specific heat $C_p$ on account of the change in the composition of the gas phase.

Numerous attempts have already been made in practice in order to achieve the power enhancement, in some cases by means of inlet cooling by using evaporation coolers or atomization, and in other cases via wet compression by supersaturation of the inlet air flow, such as in the case of "high fogging" or, less frequently, by water injection between the stages of the compressor ("interstage water injection").

"High fogging" systems can achieve a power enhancement by 7-8% with a water mass flow of 1%, in fact with comparatively low installation costs. There are numerous limits and disadvantages, however, which are associated with this application such as:

1. Limits of the Operation on Account of Environmental Conditions

Operating limit at low ambient temperature on account of icing. Due to the flow acceleration downstream of the variable inlet guide vanes (VIGV) and the temperature drop which is associated therewith, operation at ambient temperature below 10° C. can be limited.

Air inlet cooling is involved for relatively dry ambient conditions (relative humidity <60%) on account of the disturbance in the temperature profile which is associated therewith.

2. Erosion

The inlet-side blade rows are affected by erosion on account of the occurrent drops. This can have an influence upon the mechanical integrity of the blade airfoil and can lead to an increase in the risk of damage to the compressor and also have an influence upon the operating range on account of disturbances in the leading-edge geometry of the front blade row operating in the supersonic range. Possible countermeasures, such as laser coating with rare materials, are costly.

3. Reduction in the Surge Limit Margin

On account of the changes in the volumetric flow en route through the compressor, individual stages operate beyond the designed range. In the inlet stages, a flow, now becoming greater, can lead to an increase in the meridional velocities and so alter the velocity triangles so that both the impingement and the deflection are reduced. An additional effect which reduces the deflection (deviation in the flow over a compressor profile) on the inlet blades is the increasing slip factor on account of the wet surface of the blade airfoil. On the other hand, there is a decreasing volumetric flow in the rear stages because the increase in the mass flow on account of the evaporation results in a corresponding increase in the pressure in the compressor plenum and, in conjunction therewith, a reduction in the meridional velocities and an increase in the impingement and the deflection. This mismatch in the compressor stages can lead to an increase in the losses and to an aerodynamic disadvantage with regard to the efficiency. Overall, a shift of the compressor load from the front stages to the rear stages occurs as a consequence. The load which is shifted to the rear stages and the fact that the compressor operates on a raised working characteristic line, reduces the vertical surge limit margin, especially in the case of lower aerodynamic velocities. A certain minimum surge limit margin, however, should be observed in relation to a low-frequency operation of some unstable networks. Therefore, for "high-fogging" machines either a greater rigidity (high solidity in compressor blading) in the rear stages of the compressor should be provided, which increases the equipment costs and can decrease efficiency, or tighter limits in the protective concept against an underfrequency should be set, which reduces the availability of the system.

4. Reduction in the Cooling Air Supply in the Center Region of the Compressor

Pressure and temperature are influenced en route through the compressor as a result of the process of "wet compression". Since the front stages are loaded less, lower pressures are achieved in the air bleed cavities in comparison to dry operation. Also, the temperatures in the air bleed cavities are lower on account of the gas-phase feed of evaporation heat to the liquid phase. With invariable geometry of the secondary air system, a reduced cooling-air mass flow to the turbine components results from this, which can influence the service life of the turbine components. An alleviation could be effected in this case by a variable, modulating geometry of the secondary air system, which, however, increases the costs and the complexity of the system. Or, the volume of injected water is limited, resulting in a reduction in the power enhancement.

A device and a method for enhancing the output power of a gas turbine are known from printed publication EP 1 903 188 A2, in which provision is made for a washing unit which injects water into the gas turbine in order to remove deposits from the blades of the compressor. Furthermore, water can be injected into the air flow which is to be compressed in order to increase the mass flow and to augment the output of the turbine.

A combined cleaning and cooling device, with which water can be injected at different points of a compressor, is also known from U.S. Pat. No. 6,398,518.

From printed publication U.S. Pat. No. 6,634,165 it is known to control the injecting of water in the inlet tract of a gas turbine so that specific boundary conditions are maintained.

Known systems do not address a change of load in the individual compressor stages.

SUMMARY

A method is disclosed for injecting water into a multistage axial compressor of a gas turbine, comprising: injecting water at a plurality of points along the axial compressor; and controlling an injected water mass flow at individual injection points in accordance with ambient conditions and operating parameters of the gas turbine for creating an evened-out loading in individual stages of the axial compressor.

An injection system is also disclosed for a multistage axial compressor of a gas turbine, comprising: a multiplicity of individual injection devices which are arranged in series in an axial direction inside the axial compressor for injecting water into a gas passage of the axial compressor; and an injection control system for controlling a water mass flow to the individual injection devices.

BRIEF DESCRIPTION OF THE DRAWINGS

The invention shall subsequently be explained in more detail based on exemplary embodiments in conjunction with the drawing. All elements which are not essential for the direct understanding of the disclosed embodiments have been omitted. In the drawing:

FIG. 1 shows a principle schematic diagram of a compressor with multistage controllable water injection according to an exemplary embodiment.

DETAILED DESCRIPTION

A method is disclosed for injecting water into a multistage axial compressor, which includes minor interventions into the machine with simultaneously effective power enhancement even under changing boundary conditions. A corresponding injection system is disclosed.

An exemplary method is disclosed for injecting water into a multistage axial compressor of a gas turbine wherein the water is injected at a plurality of points along the axial compressor, and wherein the injected water mass flow is controlled at the individual injection points in accordance with ambient conditions and operating parameters of the gas turbine in such a way that an evened-out loading in the individual stages of the axial compressor is created.

According to an exemplary development, the water can be injected predominantly (e.g., more than 50%) between the stages of the axial compressor.

According to another exemplary development, if the axial compressor has a row of variable inlet guide vanes at the inlet, water is also injected upstream of the row of variable inlet guide vanes.

A further exemplary development is distinguished by water being delivered to the injection points by means of pumps, and by the fact that the pumps are controlled for controlling the injected water mass flow.

According to another exemplary development, the distribution of the water to the individual injection points is controlled by means of control valves in the corresponding feed lines.

A further exemplary development is characterized in that an analysis of the meridional mean line flow with a droplet evaporation model is used for controlling the injected water mass flow.

For example, the evaporation effects are calculated blade row by blade row during the analysis, and the wet compression effects of the temperature lowering and of the increase in the steam proportion are also taken into consideration.

Furthermore, the erosion rate can additionally be predicted with a model of the blade erosion.

An exemplary injection system for implementing an exemplary method disclosed herein includes a multiplicity of injection devices which are arranged in series in the axial direction inside the axial compressor, and which inject water into the gas passage of the axial compressor, and also by an injection control system which controls the water mass flow to the individual injection devices.

One exemplary development of the injection system is that provision is made for a gas turbine control system for the gas turbine, and that the injection control system is in intercommunication with the gas turbine control system.

Another exemplary development is distinguished by the injection devices being supplied with water via individual feed lines, by a control valve for throughflow control arranged in each case in the individual feed lines, and by the control valves being connected to the injection control system.

Another exemplary development of the injection system is that the water is delivered to the injection devices by means of pumps, and that the pumps are connected to the injection control system.

According to another exemplary development, the axial compressor has a row of variable inlet guide vanes at the inlet, wherein one of the injection devices is arranged upstream of the row of variable inlet guide vanes.

An exemplary method and a system are thus disclosed for injecting water into the axial compressor of a gas turbine between a plurality of stages of the compressor in order to enhance the output power of the gas turbine. In this case, the distribution of the load inside the compressor is controlled in such a way that the mass flow of the injected water is modulated at various injection points.

The control system starts, stops, modulates and limits the inflow of water to the various injection points in the compressor passage in accordance with ambient conditions and operating parameters of the machine, such as the position of the variable inlet guide vanes, the firing temperature, the supply conditions of the air cooling system, of the pressure and of the temperature in the plenum, etc.

The control system includes an analysis of the meridional mean line flow ("mean line meridional flow analysis") with a droplet evaporation model. The evaporation effects are calculated in this case blade row by blade row. The wet compression effects of the temperature lowering and of the increase in the steam proportion are also taken into consideration in order to correct the density and the meridional velocity and to modify the velocity triangles.

In this way, a large number of aerodynamic compressor parameters, which are linked to a shift in the compressor load and to a reduction in the surge limit margin (Koch factor, diffusion coefficients, load factor, flow coefficient, etc.), can be calculated and tracked. Additionally included is a model of the blade erosion, which comprises experimentally verified algorithms for predicting the erosion rate.

By modulation of the relative water volume which is injected along the compressor passage, the erosion rate can be evenly distributed in the various blade rows, as a result of which corrosion upon the inlet blades is drastically reduced. The reaction time of the droplets is drastically reduced with the axial distance from the inlet to the rear stages, which is taken into consideration in the modulation of the water mass flow.

Reproduced in FIG. 1 is a principle schematic diagram of an axial compressor 10 with multistage controllable water injection according to an exemplary embodiment disclosed herein. The axial compressor 10, which is part of a gas turbine which is not shown, comprises a rotor 11 which rotates around an axis 12 and is populated with rows of rotor blades 15, which rows are arranged in series in the axial direction and project into the gas passage 14 of the axial compressor 10. In the gas passage 14, the rotor blade rows alternate with rows of stator blades 16 which are arranged on the inner wall of a casing 13 which concentrically encloses the rotor 11. The air which is to be compressed is inducted at an inlet, lying to the right in FIG. 1, and flows in the direction of the arrow through the gas passage 14. Arranged at the inlet of the gas passage 14 is a row of variable (adjustable) inlet guide vanes 17 which control the volumetric flow through the axial compressor 10.

Injection devices 18a-d, which inject water, in the form of a cone of finely distributed droplets, obliquely against the air flow which flows through the gas passage 14, are arranged at a plurality (four, in the depicted example) of positions inside the axial compressor 10 (between the stages or at the inlet). The injection devices 18a-d are supplied with water in each case via a feed line 19a-d in which a control valve 20a-d is arranged. The water which is obtained via a feed 23 is distributed, via a check valve 21, to the feed lines 19a-d by means of two pressurized pumps 22a, b working in parallel. A drain 24 is provided downstream of the check valve 21.

The operation of the two pumps 22a, b and also the position of the individual control valves 20a-d (via the control lines which are drawn in with dashed lines) is controlled by an injection control system 25 which in its turn is in intercommunication with the actual gas turbine control system 26.

The depicted control system enables the modulation of the injected water mass flow at the various injection points (18a-d) along the gas passage 14 of the axial compressor 10. Included therein is the injection upstream of the variable inlet guide vane row (17) by means of the injection device 18d. In this way, the rate of evaporation along the axial compressor can be controlled in order to achieve the following exemplary advantage:

Adaptive control of the compressor load against a sudden increase.

The system can be retrofitted in existing machines without the rear stages having to be reinforced.

Improved protection is provided for the operation of the machine in the case of low network frequencies.

Adaptive control of the compressor load in order to weaken the influence of variations in pressure and in temperature in the cooling air supply.

The controlled water mass flow along the gas passage enables optimization of the erosion rate distribution along the blading.

Compared with the "high fogging", an increased availability for power enhancement is created.

Operating limits for the "high fogging", due to icing or inlet temperature disturbance, can be avoided by the injection upstream of the variable inlet guide vane row at low ambient temperatures or high relative air humidity being disengaged and by the water mass flow being adapted to the other injection points.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF DESIGNATIONS

10 Axial compressor
11 Rotor
12 Axis
13 Casing
14 Gas passage
15 Rotor blade
16 Stator blade
17 Variable inlet guide vane
18a-d Injection device
19a-d Feed line
20a-d Control valve
21 Check valve
22a, b Pump
23 Feed
24 Drain
25 Injection control system
26 Gas turbine control system

The invention claimed is:

1. A method for injecting water into a multistage axial compressor of a gas turbine, comprising:
   injecting water at a plurality of points along the axial compressor; and
   controlling an injected water mass flow at individual injection points in accordance with ambient conditions and operating parameters of the gas turbine for creating an evened-out loading in individual stages of the axial compressor via an analysis of a meridional mean line flow with a droplet evaporation model and a model of blade erosion.

2. The method as claimed in claim 1, wherein the injecting of the water is controlled such that more water is injected between the stages of the axial compressor than is injected at other points along the axial compressor.

3. The method as claimed in claim 2, wherein the axial compressor has a row of variable, or variably opening, inlet guide vanes at an inlet, wherein the injecting of the water is controlled such that the water is injected upstream of the row of variable inlet guide vanes.

4. The method as claimed in claim 3, comprising:
   delivering the water to the injection points by pumps; and
   controlling the pumps for controlling the injected water mass flow.

5. The method as claimed in claim 1, comprising:
   delivering the water to the injection points by pumps; and
   controlling the pumps for controlling the injected water mass flow.

6. The method as claimed in claim 1, comprising:
controlling distribution of water to the individual injection points by control valves in corresponding feed lines.

7. The method of claim 1, wherein the analysis of the meridional mean line flow with a droplet evaporation model is performed such that the meridional mean line flow is analyzed based on wet compression effects of temperature lowering and of an increase in a steam proportion to correct for density and meridional velocity; and wherein the model of blade erosion is based on experimentally verified algorithms for predicting erosion rate of blades of the axial compressor.

8. A method for injecting water into a multistage axial compressor of a gas turbine, comprising:
injecting water at a plurality of points along the axial compressor;
controlling an injected water mass flow at individual injection points in accordance with ambient conditions and operating parameters of the gas turbine for creating an evened-out loading in individual stages of the axial compressor; and
controlling the injected water mass flow via an analysis of a meridional mean line flow with a droplet evaporation model.

9. The method as claimed in claim 8, comprising:
calculating evaporation effects blade row by blade row in the analysis; and
considering wet compression effects of a temperature lowering and of an increase in steam proportion in the analysis.

10. The method as claimed in claim 9, comprising:
predicting an erosion rate with a model of blade erosion.

11. The method as claimed in claim 8, comprising:
controlling distribution of water to the individual injection points by control valves in corresponding feed lines.

12. An injection system for a multistage axial compressor of a gas turbine, comprising:
a plurality of individual injectors which are arranged in series in an axial direction inside the axial compressor for injecting water into a gas passage of the axial compressor; and
an injection control system configured to control a water mass flow to the individual injectors according to an analysis of a meridional mean line flow with a droplet evaporation model and a model of blade erosion.

13. The injection system as claimed in claim 12, comprising:
a gas turbine control system for the gas turbine, the injection control system being in intercommunication with the gas turbine control system.

14. The injection system as claimed in claim 13, comprising:
individual feed lines for supplying the injectors with water; and
a control valve for throughflow control arranged in each individual feed line, each control valve being connected to the injection control system.

15. The injection system as claimed in claim 14, comprising:
pumps for delivering water to the injectors the pumps being connected to the injection control system.

16. The injection system as claimed in claim 12, comprising:
individual feed lines for supplying the injectors with water; and
a control valve for throughflow control arranged in each individual feed line, each control valve being connected to the injection control system.

17. The injection system as claimed in claim 16, comprising:
pumps for delivering water to the injectors, the pumps being connected to the injection control system.

18. The injection system as claimed in claim 16, wherein the axial compressor comprises:
a row of variable, or variably opening, inlet guide vanes at an inlet, at least one of the injectors being arranged upstream of the row of inlet guide vanes.

19. The injection system as claimed in claim 15, wherein the axial compressor comprises:
a row of variable, or variably opening, inlet guide vanes at an inlet, at least one of the injectors being arranged upstream of the row of inlet guide vanes.

20. The injection system of claim 12, wherein the analysis of the meridional mean line flow with the droplet evaporation model and the model of blade erosion is configured such that the droplet evaporation model is based on wet compression effects of temperature lowering and of an increase in a steam proportion to correct for density and meridional velocity and the model of blade erosion is based on experimentally verified algorithms for predicting erosion rate of blades of the axial compressor; and
wherein the injection control system is configured to control the water mass flow to the individual injectors according to the analysis of a meridional mean line flow to modulate water volume that is injected so that an erosion rate for blades of the compressor is evenly distributed about multiple blade rows of the blades of the compressor.

* * * * *